US007029806B2

(12) United States Patent
Dannoux et al.

(10) Patent No.: US 7,029,806 B2
(45) Date of Patent: Apr. 18, 2006

(54) FIBER ARRAY AND METHODS FOR FABRICATING THE FIBER ARRAY

(75) Inventors: Thierry L. A. Dannoux, Avon (FR); David S. Franzen, Painted Post, NY (US); Robert Sabia, Corning, NY (US); Jackson P. Trentelman, Lawrenceville, PA (US); Candace J. Quinn, Corning, NY (US)

(73) Assignee: Corning Incorporated, Corning, NY (US)

( * ) Notice: Subject to any disclaimer, the term of this patent is extended or adjusted under 35 U.S.C. 154(b) by 313 days.

(21) Appl. No.: 10/387,936

(22) Filed: Mar. 13, 2003

(65) Prior Publication Data

US 2003/0174944 A1 Sep. 18, 2003

Related U.S. Application Data

(60) Provisional application No. 60/364,700, filed on Mar. 14, 2002.

(51) Int. Cl.
*G02B 6/32* (2006.01)

(52) U.S. Cl. .............................. 430/7; 385/33; 385/137
(58) Field of Classification Search .................... None
See application file for complete search history.

(56) References Cited

U.S. PATENT DOCUMENTS

| 2,326,012 | A | 8/1943 | Dalton ............................. 95/5 |
| 2,515,275 | A | 7/1950 | Stookey .......................... 49/92 |
| 2,515,936 | A | 7/1950 | Houston ......................... 49/92 |
| 2,515,938 | A | 7/1950 | Stookey .......................... 49/92 |
| 2,515,942 | A | 7/1950 | Stookey .......................... 49/92 |
| 2,515,943 | A | 7/1950 | Stookey .......................... 49/88 |
| 4,518,222 | A | 5/1985 | Borrelli et al. .............. 350/167 |
| 4,572,611 | A | 2/1986 | Bellman et al. ............. 350/167 |
| 4,609,259 | A | 9/1986 | Suemitsu et al. ............ 350/417 |
| 4,727,047 | A | 2/1988 | Bozler et al. .................. 437/89 |
| 4,976,148 | A | 12/1990 | Migliori et al. ................ 73/579 |
| 5,062,877 | A | 11/1991 | Borrelli et al. ............. 65/30.13 |
| 5,074,649 | A | 12/1991 | Hamanaka ................... 359/652 |

(Continued)

FOREIGN PATENT DOCUMENTS

JP            5-215934 A    *   8/1993

(Continued)

OTHER PUBLICATIONS

Corning Incorporated, Advanced Materials, Corning, NY 14831, Micro Lens Arrays Brochure.

(Continued)

*Primary Examiner*—John A McPherson
(74) *Attorney, Agent, or Firm*—Timothy M. Schaeberle

(57) ABSTRACT

A collimator array, a fiber array and a method for fabricating the fiber array are described herein. In one embodiment, that fiber array includes a plurality of optical fibers and a glass plate with a plurality of holes in each of which there is secured one of the optical fibers, wherein the holes were formed by etching away a plurality of opal regions within an exposed and heated photosensitive glass which after the etching became the glass plate. In another embodiment, the fiber array includes a plurality of optical fibers and a glass plate with a plurality of holes in each of which there is secured one of the optical fibers, wherein the holes were formed by etching away a plurality of opal regions within an exposed and heated photosensitive glass which after the etching became the glass plate that included a plurality of oversized holes which were filled with a moldable material that was then drilled to form the holes.

16 Claims, 13 Drawing Sheets

U.S. PATENT DOCUMENTS

| | | | |
|---|---|---|---|
| 5,104,435 A | 4/1992 | Oikawa et al. | 65/30.13 |
| 5,121,459 A | 6/1992 | Chiang | 385/120 |
| 5,126,863 A | 6/1992 | Otsuka et al. | 359/41 |
| 5,135,590 A | 8/1992 | Basavanhally et al. | 156/64 |
| 5,345,529 A | 9/1994 | Sizer, II et al. | 385/147 |
| 5,346,583 A | 9/1994 | Basavanhally | 156/629 |
| 5,430,819 A | 7/1995 | Sizer, II et al. | 385/59 |
| 5,482,800 A | 1/1996 | Gal | 430/5 |
| 5,552,092 A | 9/1996 | Francis et al. | 264/1.24 |
| 6,328,482 B1 | 12/2001 | Jian | 385/88 |
| 6,436,265 B1 | 8/2002 | Shimada et al. | 205/125 |
| 2002/0097957 A1 | 7/2002 | Kikuchi et al. | 385/33 |
| 2003/0068153 A1 | 4/2003 | Suzuki | 385/137 |

FOREIGN PATENT DOCUMENTS

| | | |
|---|---|---|
| WO | WO00/20899 | 4/2000 |

OTHER PUBLICATIONS

Bellman et al., Precision Glass Microlens Array by a Photothermal Technique, paper presented at SPIE O-E LASE '88, Optoelectronics and Laser Applications in Science and Engineering on Jan. 14, 1988.

Borrelli et al., Imaging and radiometric properties of microlens arrays, Applied Optics/ vol. 30, No. 25, Sep. 1, 1991, pp. 3633-3642.

Bellman et al., Fabrication and Performance of a One-To-One Erect Imaging Microlens Array For Fax, SPIE vol. 1544, Miniature and Micro-Optics Fabrication and System Applications (1991), pp. 209-217.

Borrelli et al., Photosensitive Glasses and Glass-Ceramics, Ceramic and Glasses, Engineered Materials Handbook, vol. 4 ASM International, 1991 pp. 108113.

Borrelli et al., Photolytic technique for producing microlenses in photosensitive glass, Applied Optics, vol. 24, No. 16, Aug. 15, 1985, pp. 2520-2525.

* cited by examiner

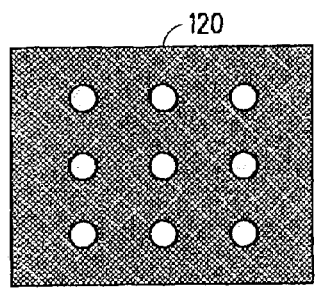
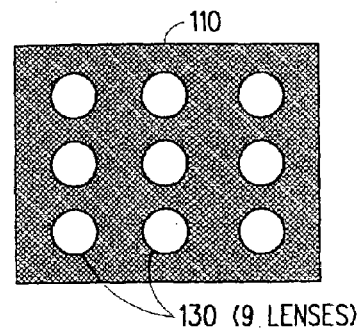
FIG. 1A (PRIOR ART)
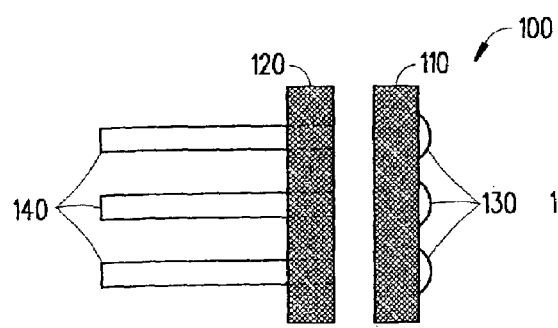
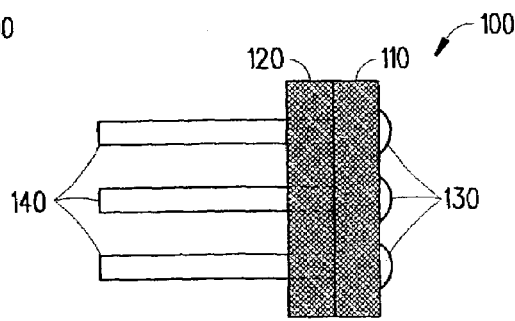
FIG. 1B (PRIOR ART)        FIG. 1C (PRIOR ART)
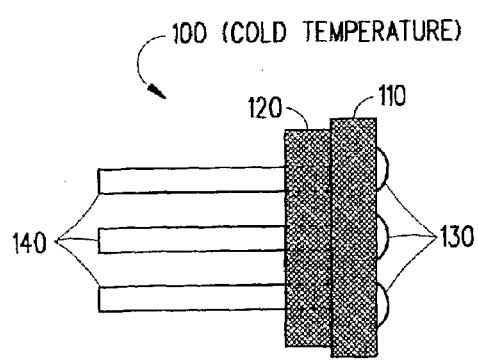
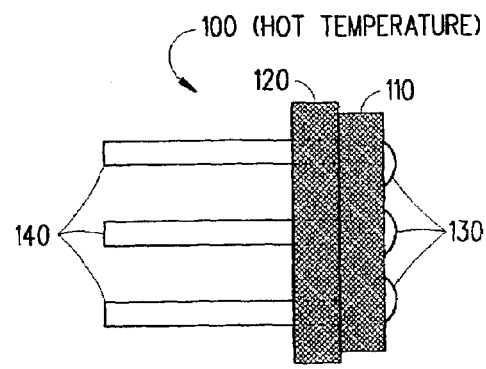
FIG. 1D (PRIOR ART)        FIG. 1E (PRIOR ART)

WAFER AFTER THERMAL CYCLE

WAFER SHOWING PRECUT ETCHING
FITTING AN 8mm DIAMETER PACKAGE

FIBER ARRAY AND METHODS FOR FABRICATING THE FIBER ARRAY

RELATED APPLICATION

This application claims the benefit of U.S. Provisional Patent Application No. 60/364,700, filed Mar. 14, 2002, entitled Fiber Array And Methods For Fabricating The Fiber Array.

BACKGROUND OF THE INVENTION

1. Field of the Invention

The present invention relates in general to the photonics field and, in particular, to a fiber array and a method for fabricating the fiber array which is coupled to a lens array to form a collimator array.

2. Description of Related Art

In the photonics field, one of the most significant design challenges today involves the development of a new and improved collimator array that can function properly over a broad range of temperatures. Referring to FIGS. 1A–1E, there are illustrated different views of a 3×3 traditional collimator array 100 which does not function well over a broad range of temperatures. The traditional collimator array 100 includes a lens array 110 and a fiber array 120 (see FIGS. 1A–1E). The lens array 110 (e.g., plano-convex microlens array 110) has formed therein an array of lenses 130 (see FIG. 1B). The fiber array 120 has mounted therein an array of optical fibers 140 (see FIG. 1B). Typically, the assembled traditional collimator array 100 can be one where the lens array 110 is physically separated from the fiber array 120 and the optical fibers 140 (see FIG. 1B). Alternatively, the assembled traditional collimator array 100 can be one where the lens array 110 is physically connected to the fiber array 120 and the optical fibers 140 (see FIG. 1C).

The traditional collimator array 100 in order to work properly should have optical fibers 140 that are aligned with the lenses 130 and remain aligned with the lenses 130 regardless of the environmental temperature. Unfortunately, the traditional collimator array 100 has optical fibers 140 that do not remain aligned with the lenses 130 when there is a change in the environmental temperature. This is because the traditional fiber array 120 is made from a material that does not have the same coefficient of thermal expansion (CTE) as the material used to make the traditional lens array 110. If the traditional fiber array 120 has a different CTE than the traditional lens array 110, then as the temperature changes the traditional fiber array 120 contracts and expands differently than the traditional lens array 110 which adversely affects the alignment between the lenses 130 and the optical fibers 140 (see FIGS. 1D–1E). This problem is especially apparent in the larger traditional collimator arrays 100. Accordingly, there is and has been a need for a collimator array that has a fiber array which contracts and expands in the same manner as a lens array when there is a change in the temperature. This need and other needs are satisfied by the collimator array, the fiber array and the method of the present invention.

BRIEF DESCRIPTION OF THE INVENTION

The present invention includes a collimator array, a fiber array and a method for fabricating the fiber array. In one embodiment, that fiber array includes a plurality of optical fibers and a glass plate with a plurality of holes in each of which there is secured one of the optical fibers, wherein the holes were formed by etching away a plurality of opal regions within an exposed and heated photosensitive glass which after the etching became the glass plate. In another embodiment, the fiber array includes a plurality of optical fibers and a glass plate with a plurality of holes in each of which there is secured one of the optical fibers, wherein the holes were formed by etching away a plurality of opal regions within an exposed and heated photosensitive glass which after the etching became the glass plate that included a plurality of oversized holes which were filled with a moldable material that was then drilled to form the holes.

BRIEF DESCRIPTION OF THE DRAWINGS

A more complete understanding of the present invention may be had by reference to the following detailed description when taken in conjunction with the accompanying drawings wherein:

FIGS. 1A–1E (PRIOR ART) are different views of traditional collimator array;

DETAILED DESCRIPTION OF THE DRAWINGS

Figure 2A:
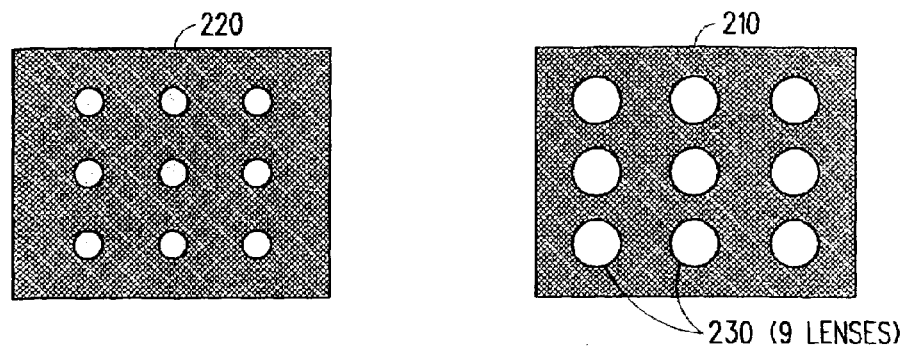
FIGS. 2A–2E are different views of a collimator array including a lens array and a fiber array of the present invention.
Figures 2B, 2C:
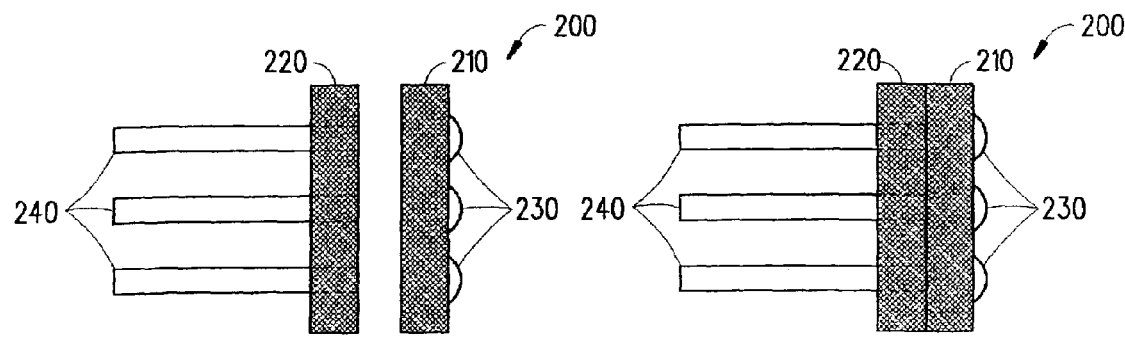
Figures 2D, 2E:
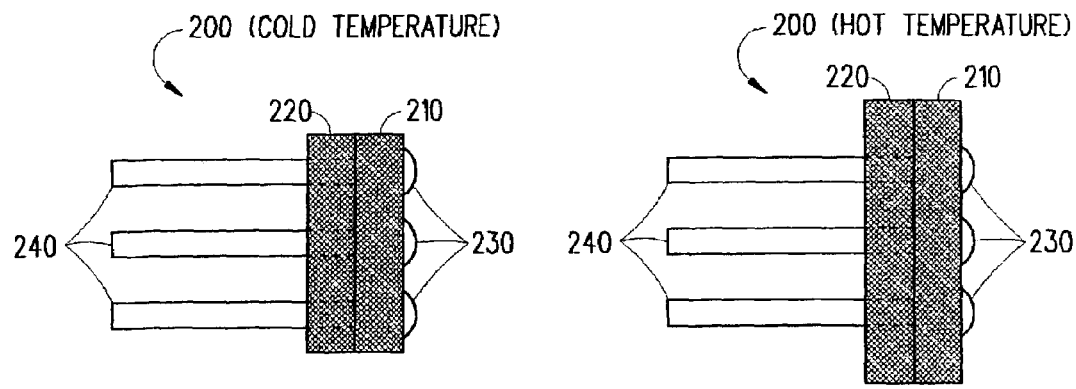

Referring to FIGS. 2–14, there are disclosed two embodiments of a fiber array and two preferred methods for fabricating the fiber arrays in accordance with the present invention. To better describe the present invention a detailed discussion about a collimator array is provided before a detailed discussion about the fiber arrays and the preferred methods for fabricating the fiber arrays.

Referring to FIGS. 2A–2E, there are illustrated different views of an exemplary 3×3 collimator array 200 that functions well over a broad range of temperatures in accordance with the present invention. It should be understood that the collimator array of the present invention is not limited to a 3×3 array of lenses 230 and optical fibers 240 but could have any number of lenses 230 and optical fibers 240.

Like the traditional collimator array 100, the collimator array 200 includes a lens array 210 and a fiber array 220. The lens array 210 (e.g., plano-convex microlens array 210) has formed therein an array of lenses 230 (see FIG. 2B). The fiber array 220 has mounted therein an array of optical fibers 240 (see FIG. 2B). Typically, the assembled collimator array 200 can be one where the lens array 210 is physically separated from the fiber array 220 and the optical fibers 240 (see FIG. 2B). Alternatively, the assembled collimator array 200 can be one where the lens array 210 is physically connected to the fiber array 220 and the optical fibers 240 (see FIG. 2C).

Unlike the traditional collimator array 100, the collimator array 200 has optical fibers 240 that are aligned with the lenses 230 and remain aligned with the lenses 230 regardless of the environmental temperature. In particular, the collimator array 200 has optical fibers 240 that remain aligned with the lenses 230 in a temperature range of between −40° C. and 100° C. This is possible because the fiber array 220 is made from a material that has the same CTE as the material used to make the lens array 210. If the fiber array 220 has the same CTE as the lens array 210, then as the temperature changes the fiber array 220 contracts and expands in the same manner as the lens array 210. Thus, the alignment between the lenses 230 and the optical fibers 240 is not lost during a change in the temperature as it is between the lenses 130 and the optical fibers 140 in the traditional collimator array 100 (compare FIGS. 2D–2E to FIGS. 1D–1E).

To ensure that the fiber array 220 and the lens array 210 have matching CTEs, the fiber array 220 can be made from the same material used to make the lens array 210. Today some commercially available lens arrays 210 are made from a photosensitive glass plate which is subjected to an ultraviolet light exposure step and a heat treatment step in accordance with the SMILE® process (see, e.g., U.S. Pat. Nos. 4,572,611, 4,518,222 and 5,062,877). As such, the material used to make the fiber array 220 can be a photosensitive glass plate. In the preferred embodiment, the photosensitive glass plate is a photonucleable, crystallizable lithium-silicate glass body marketed by Corning Incorporated under the brand name of FOTOFORM® glass. A more detailed discussion about the composition of FOTOFORM® glass is provided in U.S. Pat. Nos. 2,326,012, 2,422,472, 2,515,936, 2,515,938, 2,515,275, 2,515,942 and 2,515,943 the contents of which are incorporated herein by reference.

Basically in the preferred embodiment, the fiber array 220 is a glass plate that has formed therein a series of holes in each of which is secured an optical fiber 240. The glass plate is originally a photosensitive glass plate (e.g., FOTOFORM® glass plate) that is subjected to one of the two processes described below with respect to methods 300 and 1200 (see FIGS. 3 and 12). Because, there are two different methods 300 and 1200 for fabricating the fiber array 200 there are described below two different fiber arrays 220' and 220".

Referring to FIGS. 3 and 4A–4E, there are respectively illustrated a flowchart of the preferred method 300 for making the first embodiment of the fiber array 220' and various cross-sectional side views and top views of the fiber array 220' at different steps in the preferred method 300. Beginning at step 302, a photomask 402 is placed in contact with a photosensitive glass plate 404 (see FIG. 4A). In the preferred embodiment, the photosensitive glass plate 404 is a photonucleable, crystallizable lithium-silicate glass wafer marketed by Corning Incorporated under the brand name of FOTOFORM® glass. The photosensitive glass plate 404 which is typically a 62 mm diameter wafer is ground and polished to make a suitably sized substrate that is going to be one or more fiber arrays 220' (see FIGS. 6A and 6B). However, for clarity, the photosensitive glass plate 404 shown in FIGS. 4A–4G is used to make only one fiber array 220'.

The contact can be an air interface 403 between the photomask 402 and the photosensitive glass plate 404. Instead of having the air interface 403, an oil closely matching the index of glass such as glycerin can be used as a medium between the photomask 402 and the photosensitive glass plate 404 to help eliminate the air gap 403 and the resulting reflection and/or scattering of light that can result from the air gap 403.

Figure 4A:
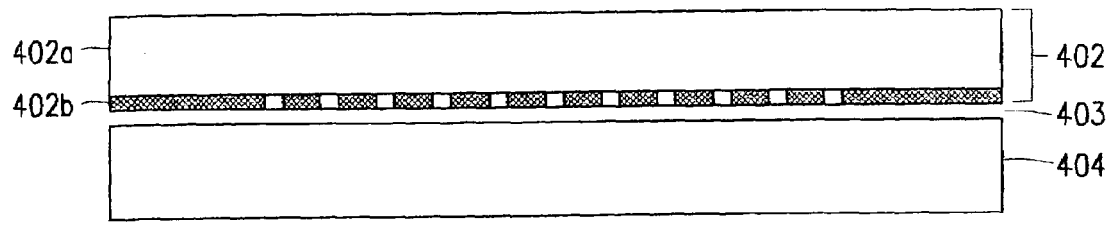
FIGS. 4A–4E illustrate cross-sectional side views and top views of the first embodiment of the fiber array at different steps in the method shown in FIG. 3.
Figure 4B:
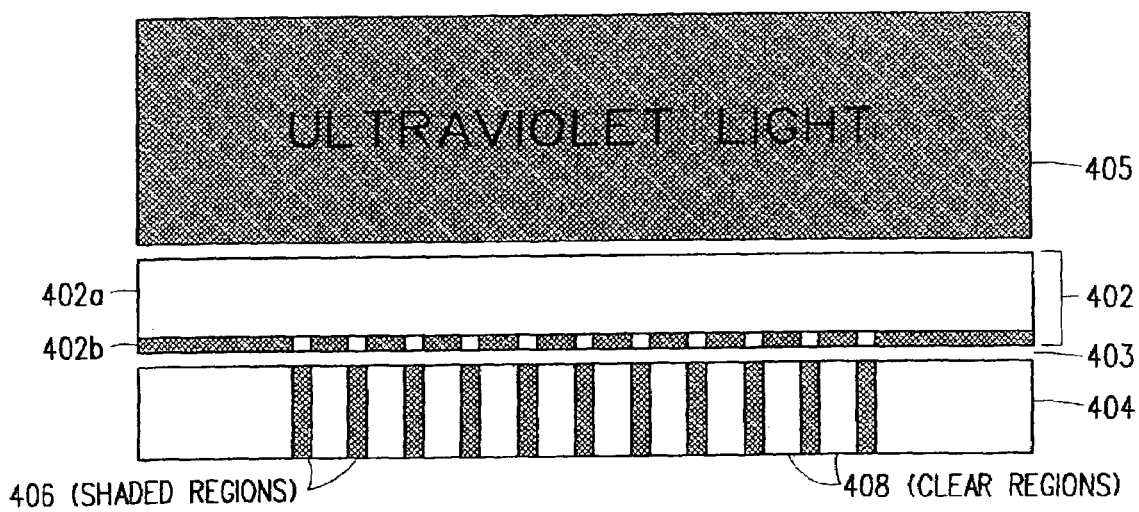

At step 304, the photomask 402 and selected regions of the photosensitive glass plate 404 are exposed to an ultraviolet light 406 (see FIG. 4B). In the preferred embodiment, the photomask 402 is a chrome-on-quartz photomask 402 which is used to control the exposure pattern on the photosensitive glass plate 404. The chrome-on-quartz photomask 402 includes a quartz substrate 402a and a chromium layer 402b. The chrome in the chromium layer 402b of the photomask 402 is absent where opal regions 406 (shown as shaded regions) are desired in the photosensitive glass plate 404. In particular, each opal region 406 is a composite of a glass phase and a lithium metasilicate nano-crystalline phase where the later is about 20% by volume of the composite. And, the chrome in the chromium layer 402b of the photomask 402 is present where glass regions 408 (shown as clear regions) are desired in the photosensitive glass plate 404. Typically the orientation of the photosensitive glass plate 404 is maintained between the exposure step 304 and the heat treatment step 306.

The exposure step 304 can be performed by any method that is capable of producing an ultraviolet light or shortwave radiation with sufficient energy to nucleate the opal phase (future opal regions 406) in the photosensitive glass plate 404 and with sufficient collimation so that the exposure is well defined through the photosensitive glass plate 404. For example, a 100 W UV Xenon lamp (e.g., Hanovia L 5179 or ORIEL 6271) can be used to expose the photosensitive glass plate 404. In this example, the light power applied to the photomask 402 and the photosensitive glass plate 404 is 1.06 Lux with an exposure of 240–400 nm (most preferable 300–350 nm) for 12 minutes, where deviations from this range result in longer exposure times. After the exposure step 304, the photomask 402 is separated from the exposed photosensitive glass plate 404. If needed, the exposed photosensitive glass plate 404 is washed with soap and water to remove dust, contaminants, residue etc..

It should be understood that the photosensitive glass plate 404 needs to be protected, at all stages prior to the heat treatment step 306, from ambient ultraviolet exposure (e.g., sunlight, unfiltered artificial light) to prevent trace amounts of opal formation in areas where glass regions 408 are desired in the final product.

Figure 4C:
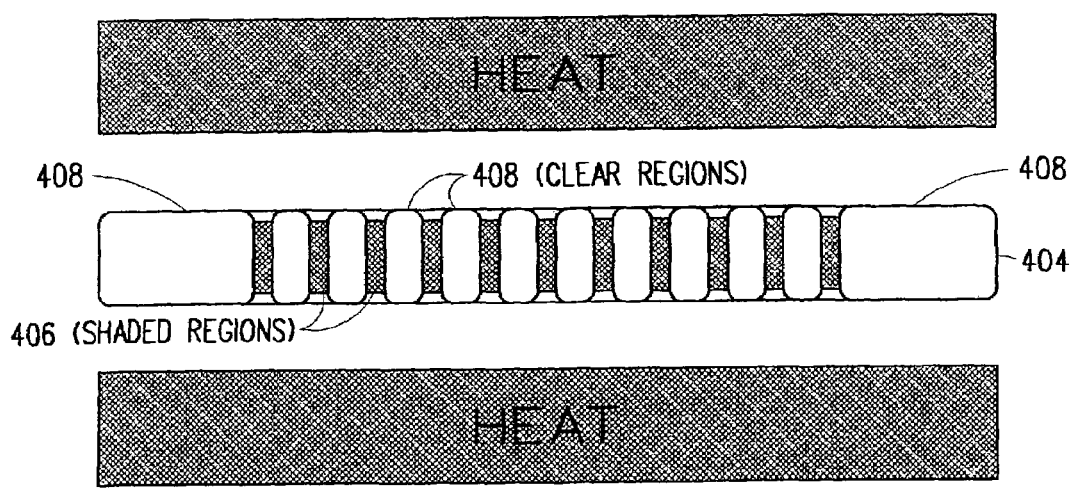

At step 306, the exposed photosensitive glass plate 404 is heated to form therein the opal regions 406 (shown as shaded regions) and the glass regions 408 (shown as clear regions)(see FIG. 4C). In the preferred embodiment, the heat treatment step 306 is done in a furnace or oven (e.g., annealing oven) with the exposed photosensitive glass plate 404 placed on a setter plate. In particular, the exposed photosensitive glass plate 404 is placed on the setter plate with the exposed face of the exposed photosensitive glass plate 404 facing up to avoid direct contact with the setter plate. It should be understood that during the heating step 306, the opal regions 406 shrink considerably more than the glass regions 408 in the photosensitive glass plate 404 (FOTOFORM® glass)(see FIG. 4C).

The annealing oven heats the exposed photosensitive glass plate 404 in accordance with a predetermined thermal cycle. Table 1 shows an exemplary thermal cycle that can be used to heat the exposed photosensitive glass plate 404:

TABLE 1

| Time Cumulated (minutes) | Temperature (° C.) |
| --- | --- |
| 0 | 20 |
| 20 | 400 |
| 40 | 400 |
| 63 | 515 |
| 83 | 515 |
| 100 | 600 |
| 145 | 600 |
| 150 | 450 |
| 210 | 20 |

Figure 5:
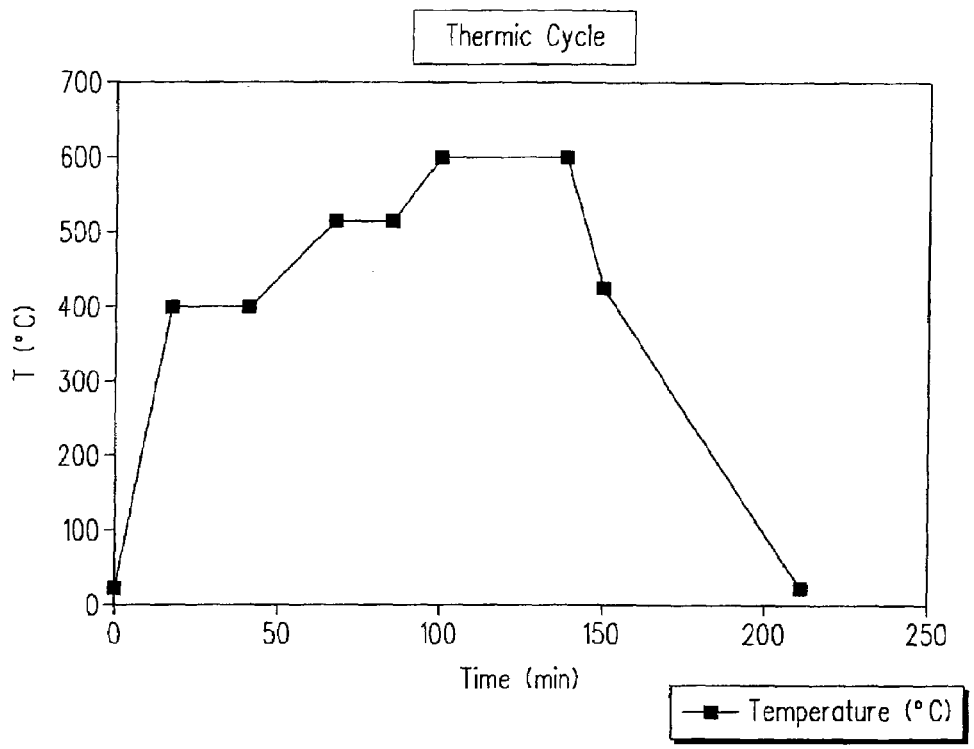
FIG. 5 is a graph illustrating in greater detail an exemplary thermal cycle of the heat treatment step 306 in the method shown of FIG. 3.
Figure 6A:
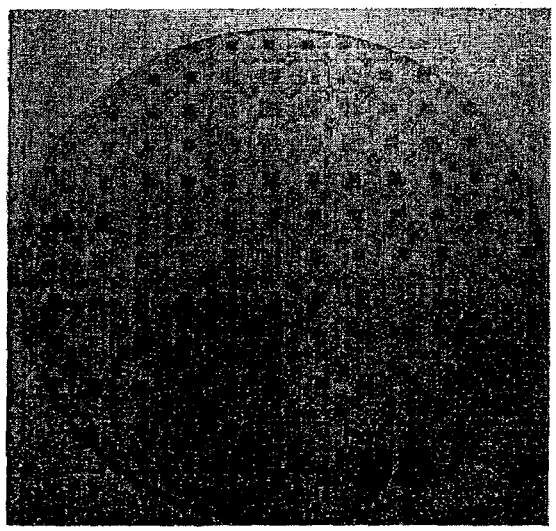
FIGS. 6A and 6B are photographs of a wafer containing a series of pre-etched fiber arrays after the heat treatment step 306 in the method shown in FIG. 3.
Figure 6B:
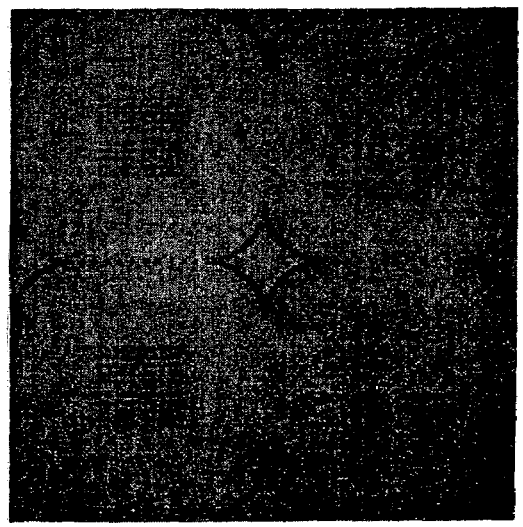

Reference is made to FIG. 5, which illustrates a graph of the exemplary thermal cycle shown in TABLE 1. Reference is also made to FIGS. 6A and 6B, which are photographs of the heated photosensitive glass plate 404 shown as a wafer containing a series of pre-etched fiber arrays 220'. The cleanliness of the annealing oven and the exposed photosensitive glass plate 404 is important during the heat treatment step 306. After completing steps 302, 304 and 306, the heated photosensitive glass plate 404 is basically a glass composite plate.

In the event, the photosensitive glass plate 404 is FOTOFORM® glass 404 then the heated photosensitive glass plate 404 could be produced by exposing the FOTOFORM® glass 404 to ultraviolet light with a wavelength of 240–400 nm (most preferable 300–350 nm) and then heat treating the exposed FOTOFORM® glass 404 to form the opal regions 406 and the glass regions 408. The opal regions 406 have ceramic particles and as such they have a greater density than the glass regions 408. The mechanism for formation of nuclei that enables the growth of the ceramic particles in the opal regions 406 starts when cerium III ($Ce^{3+}$) in the FOTOFORM® glass 404 absorbs the ultraviolet light and converts to cerium IV ($Ce^{4+}$) which results in the release of an electron. The electron is absorbed by metal ions, for example silver ions ($Ag^{1+}$), in the FOTOFORM® glass 404 and converts these ions to metal (e.g., $Ag^{\circ}$). Alternative metal ions include gold, copper and palladium.

Figure 4D:
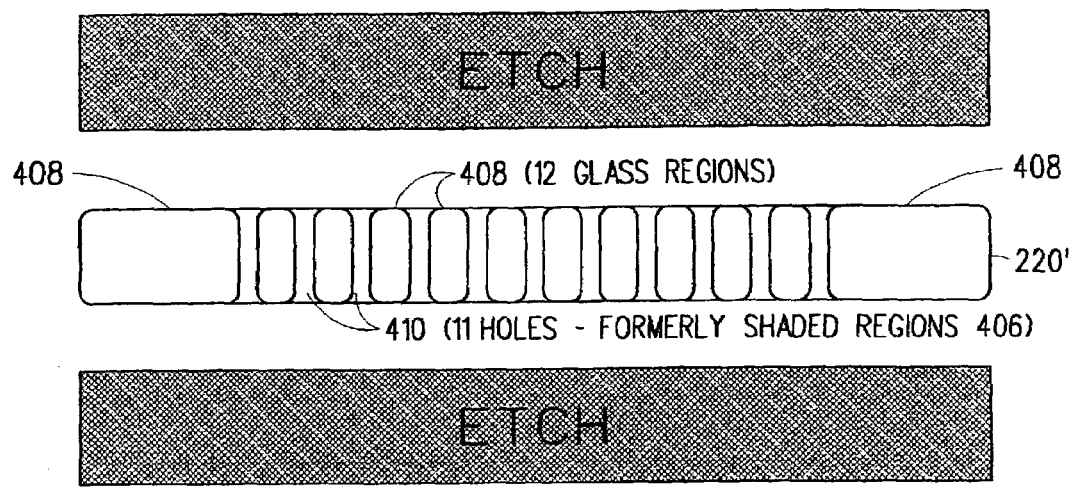
Figure 4E:
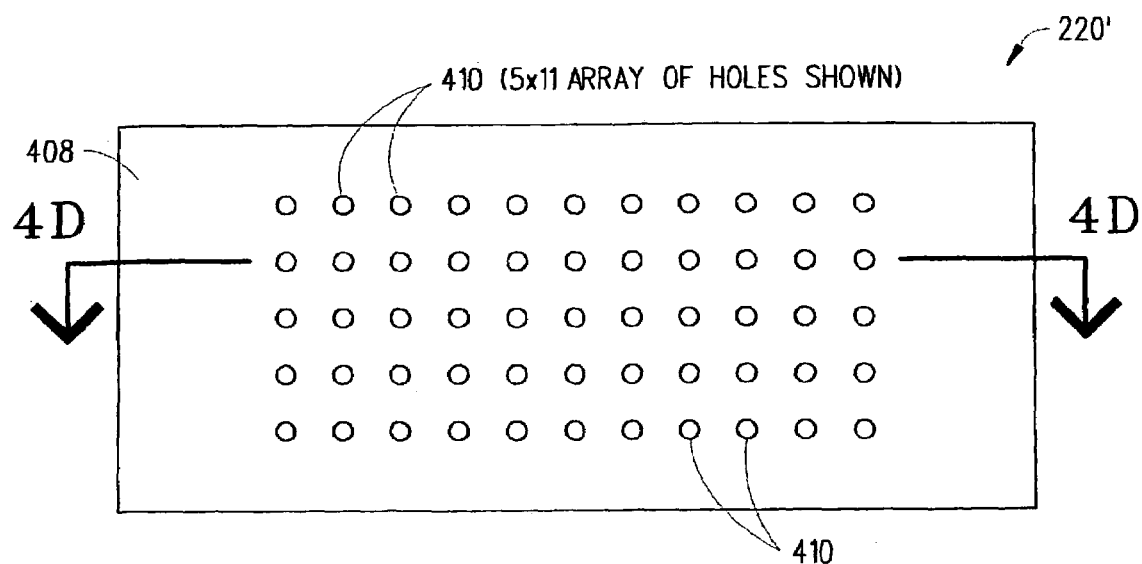

At step 308, the heated photosensitive glass plate 404 is etched until the opal regions 406 (shown as shaded regions) are etched away to form holes 410 (see FIG. 4D). For example, the heated photosensitive glass plate 404 can be etched by submerging it in a 6–13% HF agitated bath at room temperature to 90° C. (see FIG. 7 for more detailed etching step 308). At this point, the heated photosensitive glass plate 404 resembles the fiber array 220' but is no longer a glass composite plate but is instead a glass plate. This is because the opal regions 406 have been etched away to form the holes 410 thus leaving a glass plate resembling the fiber array 220' (see FIGS. 4D and 4E). In the preferred embodiment, the locations of the holes 410 are selected based on the center points of the lenses in the lens array (see FIG. 2). A detailed description about the preferred etching step 308 is provided below with respect to FIGS. 7–11.

Figure 7:
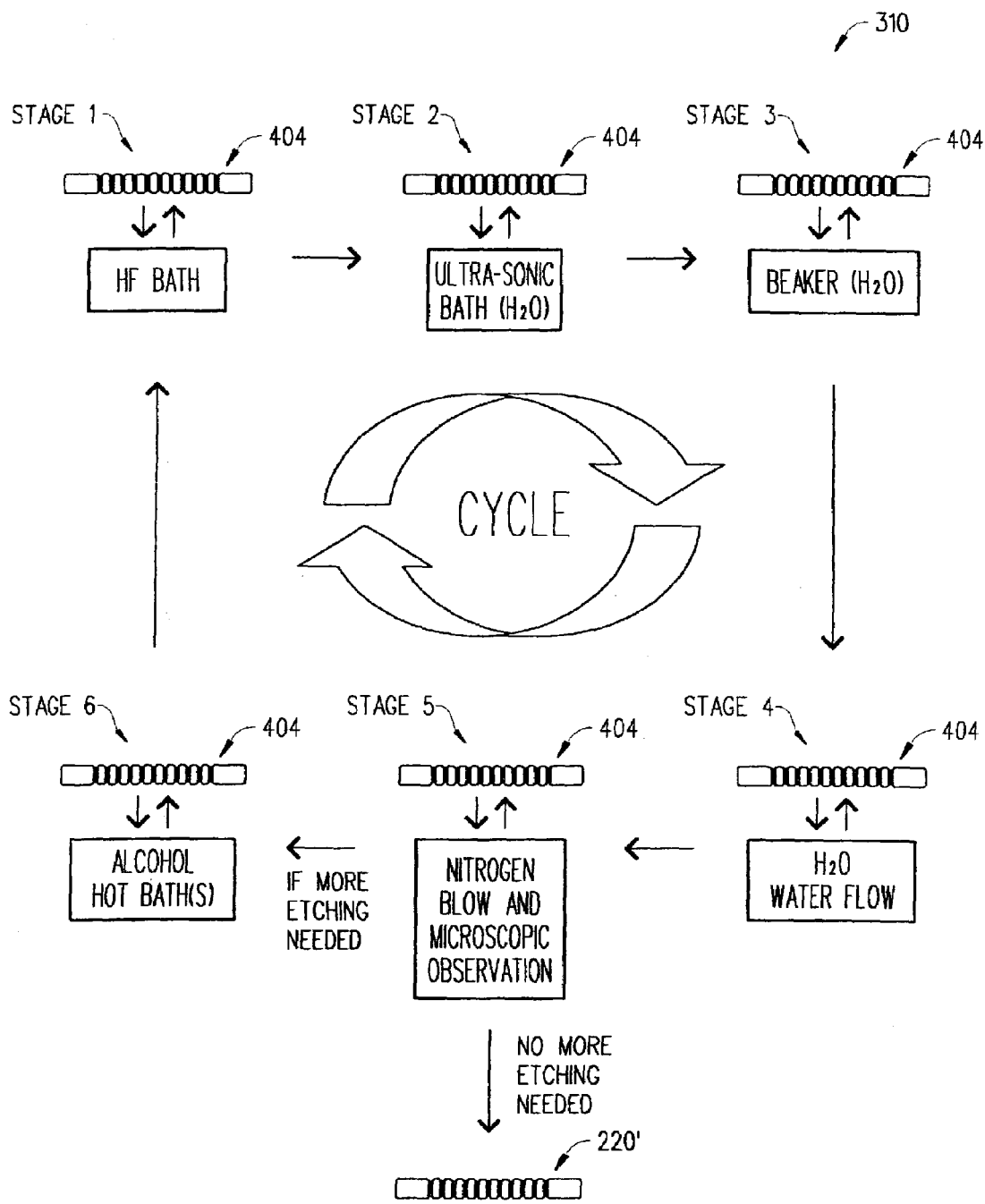
FIG. 7 is a block diagram illustrating in greater detail the different stages of the etching step 308 in the method shown in FIG. 3.

Referring to FIG. 7, there is a block diagram illustrating in greater detail the different stages of the preferred etching step 308. After the heating step 306, the polished side of the heated photosensitive glass plate 404 is covered with a wax layer (not shown) that is soluble in hydrofluoric acid (HF). The wax layer which is 25% bee wax and 75% colophane resin is hot deposited at around 60° C. onto the polished side of the heated photosensitive glass plate 404. At stage 1, the heated photosensitive glass plate 404 (glass composite plate) including the wax layer is submerged in a 13% HF bath at 20° C. for approximately 30 minutes for the first cycle and approximately 10 minutes for subsequent cycles. At stage 2, the heated photosensitive glass plate 404 (possibly a glass plate 404 at this time) is rinsed with water for a few seconds in an ultra-sonic bath (e.g., Transsonic 460H). At stage 3, the heated photosensitive glass plate 404 is rinsed again with water in a beaker. At stage 4, the heated photosensitive glass plate 404 is rinsed for a third time under a water flow. At stage 5, the heated photosensitive glass plate 404 is dried using a nitrogen blow and absorbing sheets (e.g., CONTEC C1). At this point a microscope (e.g., Werth 3D Measurement Apparatus) is used to observe the etched holes in the glass plate 404 (see FIGS. 8–9). If the etched holes are not "desirable" i.e. they do not have the targeted dimensions, then the partially etched heated photosensitive glass plate 404 is placed into three successive hot alcohol baths to remove the wax layer. Thereafter, stages 1–5 are repeated until the etched holes become "desirable" and have the targeted dimensions. For example, to achieve a 126 μm bi-conical hole, the first etching cycle could make the first side reach 115 μm (measured on three to four point) and then the side masking wax is removed and the second etching cycle is performed on both sides which could deliver the 126 μm bi-conical holes. At this point, the glass composite plate becomes a glass plate resembling the fiber array 220' (see FIGS. 8–11).

Figure 3:
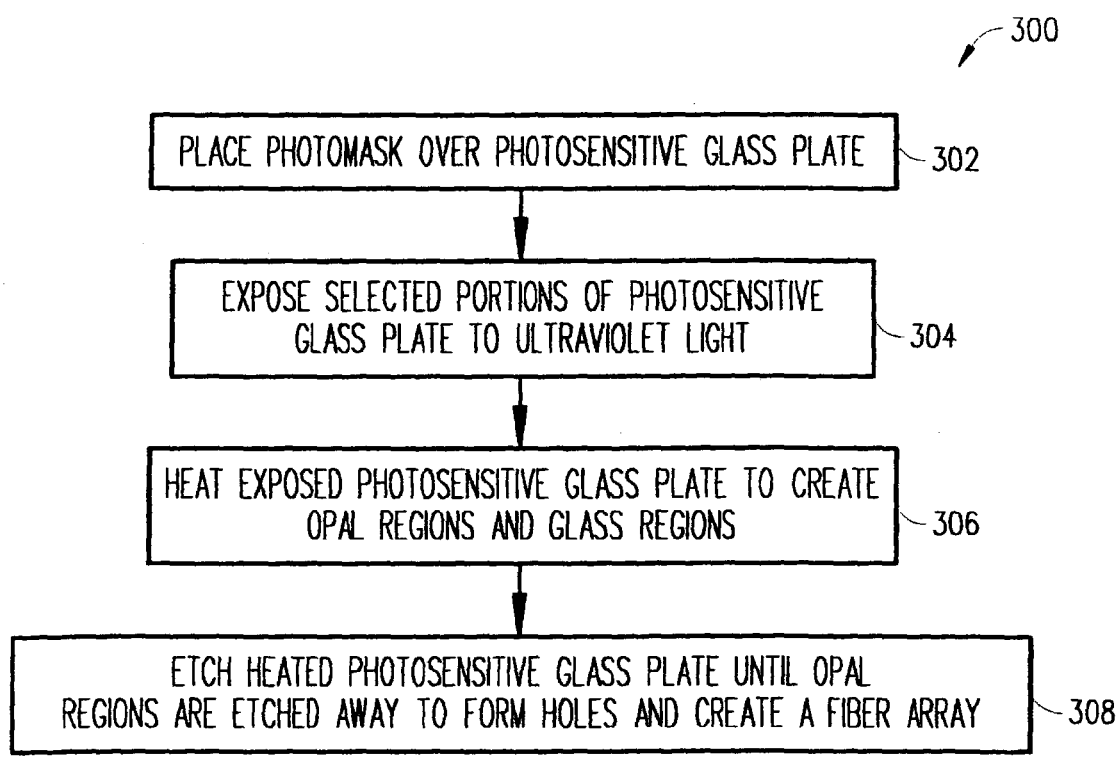
FIG. 3 is a flowchart illustrating the steps of a preferred method for fabricating a first embodiment of the fiber array in accordance with the present invention.
Figure 8A:
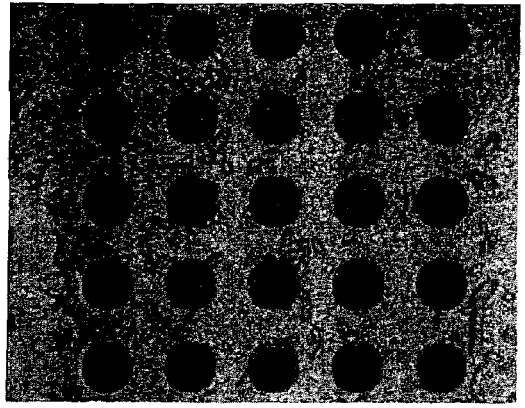
FIGS. 8A and 8B are photographs of each side of an exemplary fiber array after the etching step 308 in the methods shown in FIGS. 3 and 7.
Figure 8B:
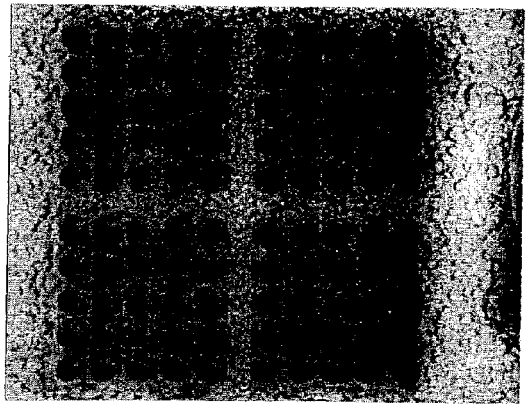
Figure 9:
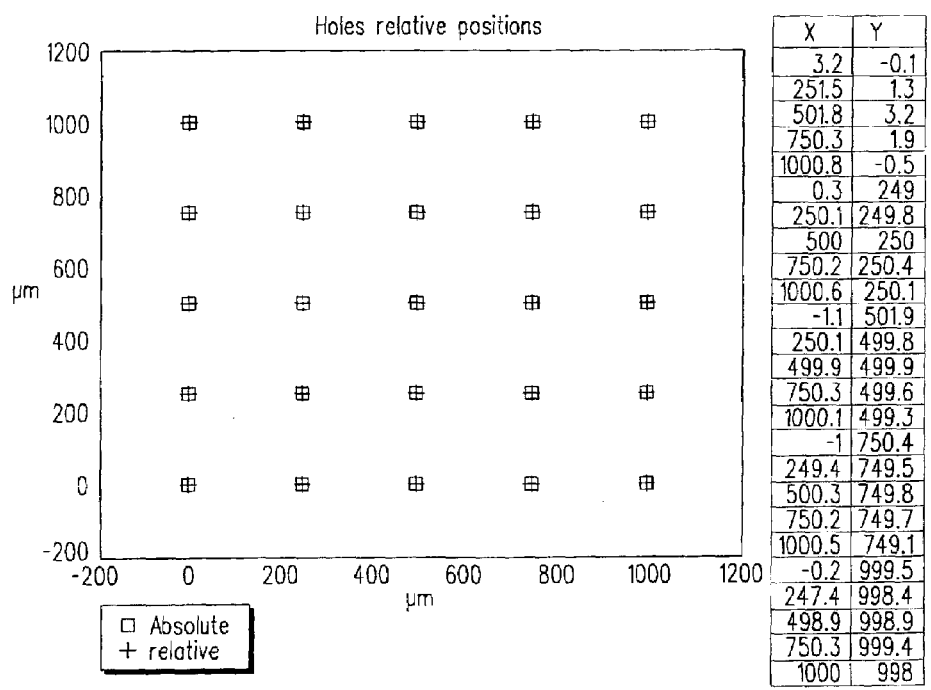
FIG. 9 is a graph and table illustrating the relative positions of the etched holes in the exemplary fiber array shown in FIGS. 8A and 8B.

Referring to FIGS. 8A and 8B, there are photographs of each side of an exemplary fiber array 220' made in accordance with the methods shown in FIGS. 3 and 7. FIG. 8A is a photograph of the protected side (wax layered side) of the exemplary fiber array 220'. FIG. 8B is a photograph of the non-protected side (non-waxed layered side) of the exemplary fiber array 220'. Referring to FIG. 9, there is a graph and a table illustrating the dimensional measurements of the etched holes in the exemplary fiber array 220' shown in FIGS. 8A and 8B.

Figure 10A:
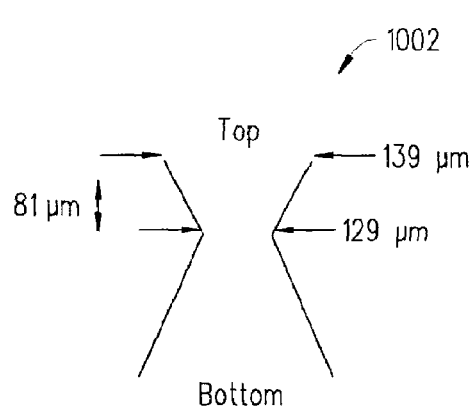
FIGS. 10A and 10B are respectively a diagram of a profile of an etched hole having a 140 µm pitch diameter and a photograph of an exemplary fiber array having a series of etched holes with a 140 µm pitch diameter.
Figure 10B:
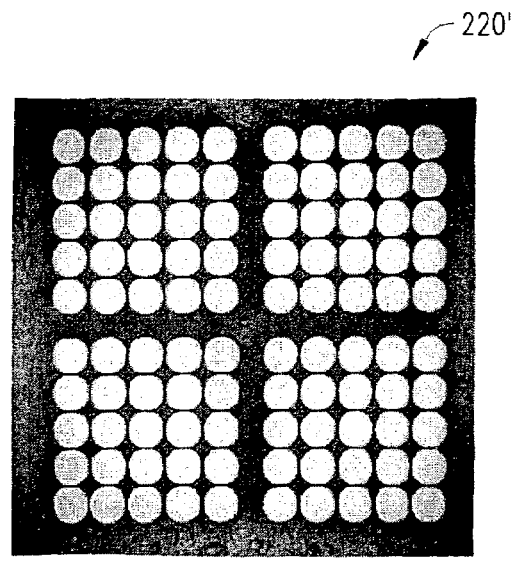
Figure 11A:
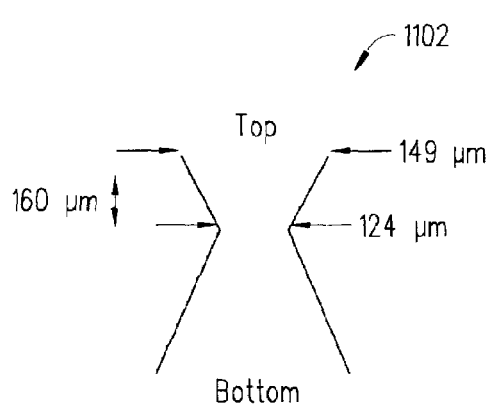
FIGS. 11A and 11B are respectively a diagram of a profile of an etched hole having a 250 µm pitch diameter and a photograph of an exemplary fiber array having a series of etched holes with a 250 µm pitch diameter.
Figure 11B:
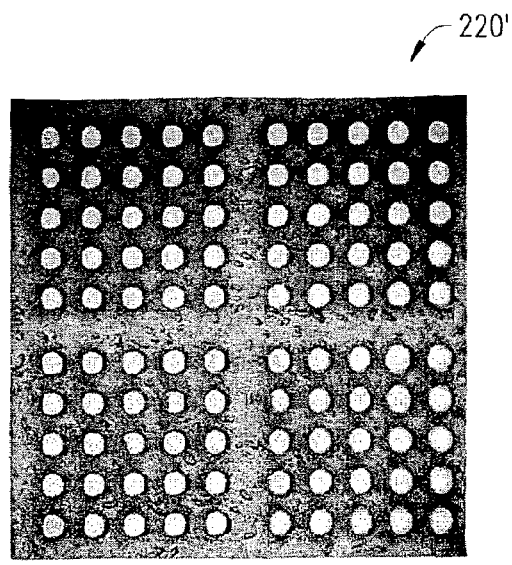
Figure 12:
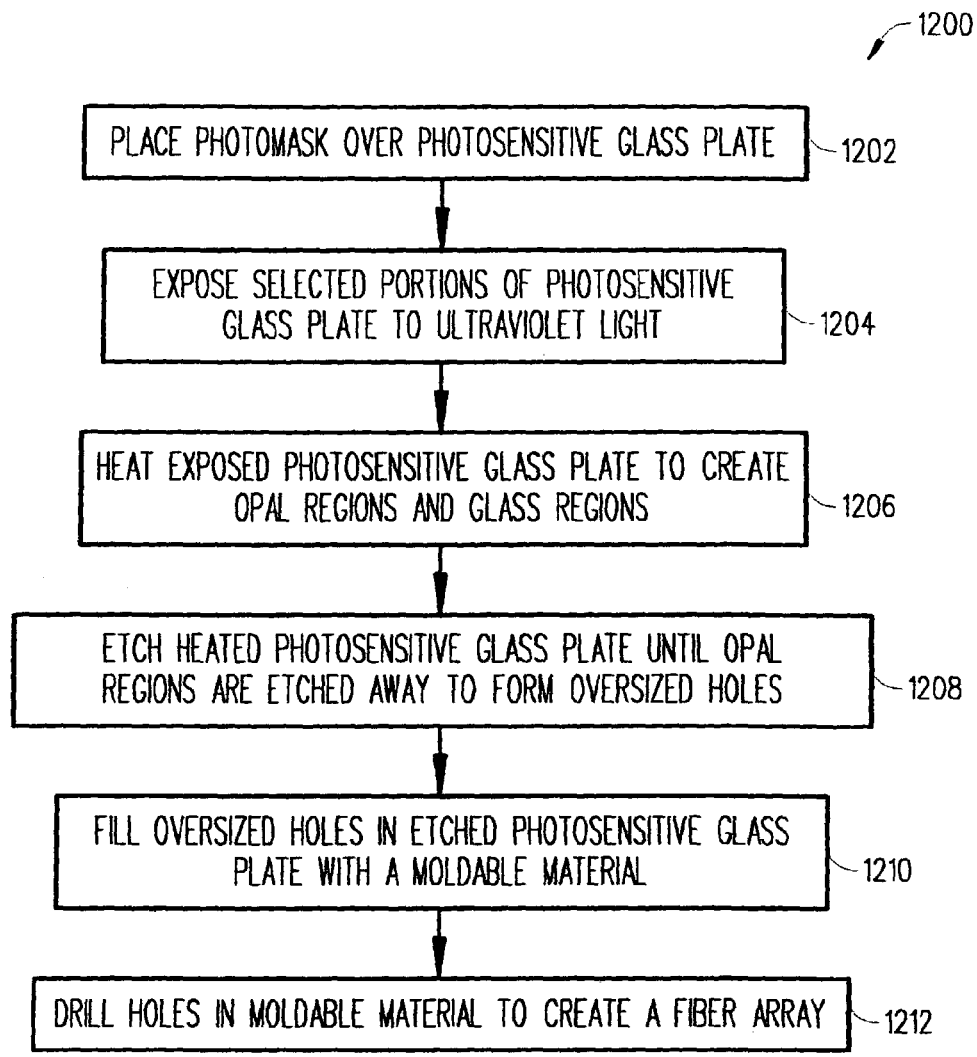
FIG. 12 is a flowchart illustrating the steps of a preferred method for fabricating a second embodiment of the fiber array in accordance with the present invention.

It should be understood that the etching time is variable depending on the diameter of the etched holes 410, the plate 404 thickness, the HF concentration and the glass-ceramic microstructure as dictated by the thermal treatment. For example, holes with a 140 μm diameter etch faster than holes with a 250 μm diameter. FIGS. 10A and 10B respectively show a diagram of a profile of a hole 1002 having a 140 μm pitch diameter and a photograph of an exemplary fiber array 220' having a series of holes 1002 with a 140 μm pitch diameter. FIGS. 11A and 11B respectively show a diagram of a profile of a hole 1102 having a 250 μm pitch diameter and a photograph of an exemplary fiber array 220' having a series of holes 1102 with a 250 μm pitch diameter.

It should also be understood that the fiber array 220' can be coupled to a lens array to form a collimator array that can be used to perform a variety of signal processing steps including multiplexing, switching, filtering, polarizing and demultiplexing. Following is a brief list of some of other photonic applications that can use a collimator array:

Laser diode arrays.
Optical Interconnects.
Contact image sensors.
Light emitting diode arrays.
Liquid crystal display projection systems.
Charge coupled device with a direct mounted lens array.
2-D and 3-D optical switches.

Referring to FIGS. 12 and 13A–13G, there are respectively illustrated a flowchart of the preferred method 1200 for making the second embodiment of the fiber array 220" and various cross-sectional side views and top views of the fiber array 220" at different steps in the preferred method 1200. Beginning at step 1202, a photomask 1302 is placed in contact with a photosensitive glass plate 1304 (see FIG. 13A). In the preferred embodiment, the photosensitive glass plate 1304 is a photonucleable, crystallizable lithium-silicate glass body marketed by Corning Incorporated under the brand name of FOTOFORM® glass. The photosensitive glass plate 1304 is ground and polished to make a suitably sized substrate that is going to be one or more of the fiber arrays 220". The dimensions of the photosensitive glass plate 1304 can differ significantly depending on the application but the thickness preferably should not be less than about 0.075" or greater than about 0.25".

The contact can be an air interface 403 between the photomask 402 and the photosensitive glass plate 404. Instead of having the air interface 403, an oil closely matching the index of glass such as glycerin can be used as a medium between the photomask 402 and the photosensitive glass plate 404 to help eliminate the air gap 403 and the resulting reflection and/or scattering of light that can result from the air gap 403.

Figure 13A:
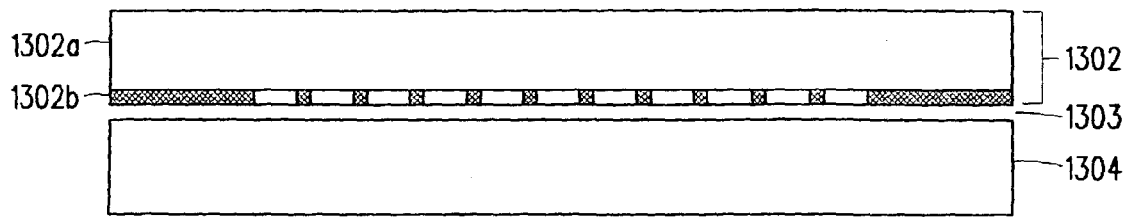
FIGS. 13A–13G illustrate cross-sectional side views and top views of the second embodiment of the fiber array at different steps in the method shown in FIG. 12.
Figure 13B:
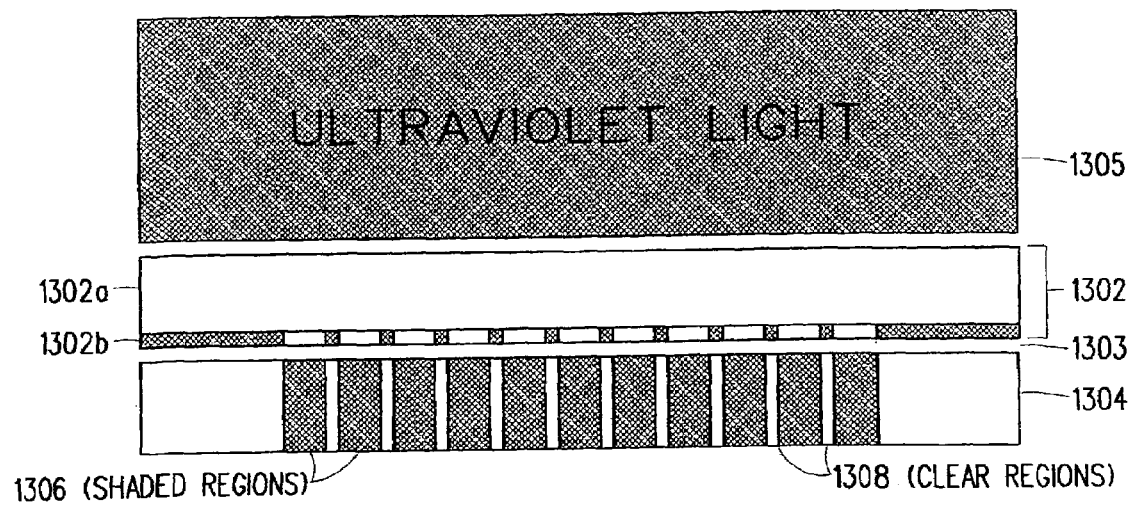

At step 1204, the photomask 1302 and selected regions of the photosensitive glass plate 1304 are exposed to an ultraviolet light 1306 (see FIG. 13B). In the preferred embodiment, the photomask 1302 is a chrome-on-quartz photomask 1302 which is used to control the exposure pattern on the photosensitive glass plate 1304. The chrome-on-quartz photomask 1302 includes a quartz substrate 1302a and a chromium layer 1302b. The chrome in the chromium layer 1302b of the photomask 1302 is absent where opal regions 1306 (shown as shaded regions) are desired in the photosensitive glass plate 1304. And, the chrome in the chromium layer 1302b of the photomask 1302 is present where glass regions 1308 (shown as clear regions) are desired in the photosensitive glass plate 1304. Typically the orientation of the photosensitive glass plate 404 is maintained between the exposure step 304 and the heat treatment step 306.

The exposure step 1204 can be performed by any method that is capable of producing an ultraviolet light or shortwave radiation with sufficient energy to nucleate the opal phase (future opal regions 1306) in the photosensitive glass plate 1304 and with sufficient collimation so that the exposure is well defined through the photosensitive glass plate 1304. For example, an ultraviolet light with an intensity of 5.5 to 7.5 mW/cm$^2$ for 1–10 minutes can be used to expose the photosensitive glass plate 1304.

After the exposure step 1204, the photomask 1302 is separated from the exposed photosensitive glass plate 1304. If needed, the exposed photosensitive glass plate 404 is washed with soap and water to remove dust, contaminants, residue etc.. It should be understood that the photosensitive glass plate 404 needs to be protected, at all stages prior to the heat treatment step 306, from ambient ultraviolet exposure (e.g., sunlight, unfiltered artificial light) to prevent trace amounts of opal formation in areas where glass regions 408 are desired in the final product.

Figure 13C:
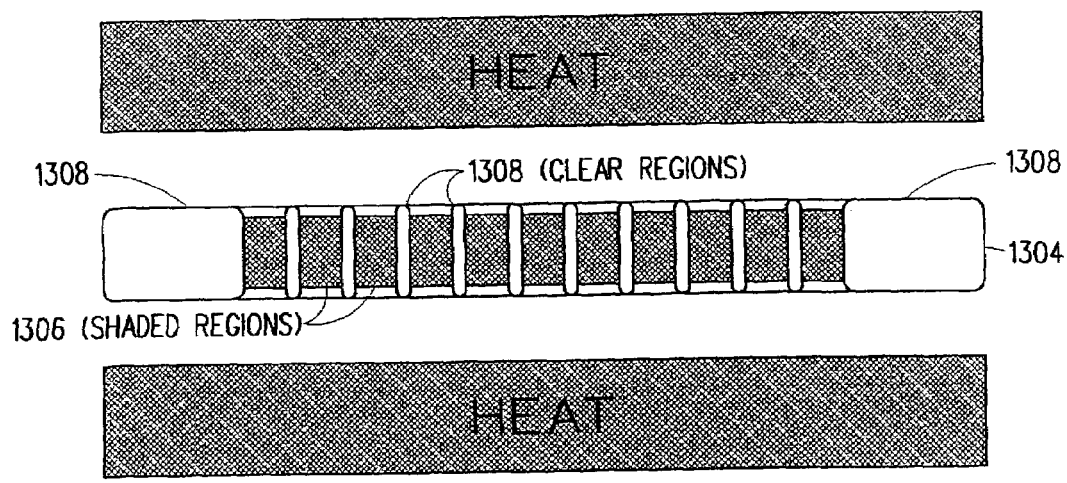

At step 1206, the exposed photosensitive glass plate 1304 is heated to form therein the opal regions 1306 (shown as shaded regions) and the glass regions 1308 (shown as clear regions)(see FIG. 13C). In the preferred embodiment, the heat treatment step 1206 is done in a furnace with the exposed photosensitive glass plate 1304 placed in a covered stainless steel box with flowing dry nitrogen. In particular, the exposed photosensitive glass plate 1304 is placed on a former or flat plate with the exposed face of the exposed photosensitive glass plate 1304 facing up. The former can be any glass, ceramic or glass-ceramic material which the exposed photosensitive glass plate 1304 does not fuse to during the heat treatment step 1206 and does not deform during the heat treatment step 1206. Powdered $Al_2O_3$ (for example) can be spread on the former to act as a parting agent. A typical heat treat schedule could be as outlined in TABLE 1 or as follows:

460° C./hr to 480° C.
180° C./hr to 590° C.
Hold @ 590° C. for 40 minutes.
Cool furnace rate.

During the heating step 1206, the opal regions 1306 shrink considerably more than the glass regions 1308 in the heated photosensitive glass plate 1304 (see FIG. 13C). After completing steps 1202, 1204 and 1206, the heated photosensitive glass plate 1304 is basically a glass composite plate.

In the event, the photosensitive glass plate 1304 is FOTOFORM® glass 1304 then the heated photosensitive glass plate 1304 could be produced by exposing the FOTOFORM® glass 1304 to ultraviolet light with wavelengths between 240–400 nm (most preferable 300–350 nm) and then heat treating the exposed FOTOFORM® glass 1304 to form the opal regions 1306 and the glass regions 1308. The opal regions 1306 have ceramic particles and as such they have a greater density than the glass regions 1308. The mechanism for formation of nuclei that enables the growth of the ceramic particles in the opal regions 1306 starts when cerium III ($Ce^{3+}$) in the FOTOFORM® glass 1304 absorbs the ultraviolet light and converts to cerium IV ($Ce^{4+}$) which results in the release of an electron. The electron is absorbed by metal ions, for example silver ions ($Ag^{1+}$), in the FOTOFORM® glass 1304 and converts these ions to metal (e.g., $Ag°$). Alternative metal ions include gold, copper and palladium. A more detailed discussion about the composition of FOTOFORM® glass is provided in U.S. Pat. Nos. 2,326,012, 2,422,472, 2,515,936, 2,515,938, 2,515,275, 2,515,942 and 2,515,943 the contents of which are incorporated herein by reference.

Figure 13D:
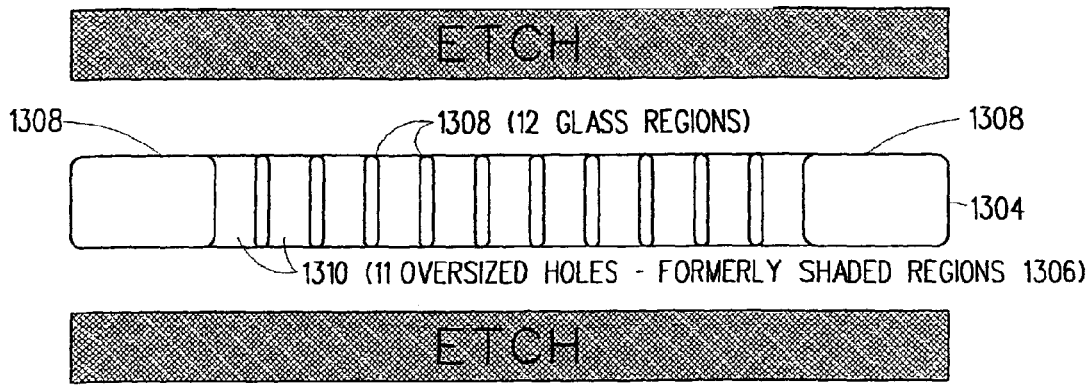

At step 1208, the heated photosensitive glass plate 1304 is etched until the opal regions 1306 (shown as shaded regions) are etched away to form oversized holes 1310 (see FIG. 13D). In the preferred embodiment, the heated photosensitive glass plate 1304 (glass composite plate) is submerged into and etched by a 6–13% hydrofluoric acid (HF) agitated bath that is some where between room temperature and 90° C. At this point, the heated photosensitive glass plate 1304 is no longer a glass composite plate but is instead a glass plate. This is because the opal regions 1306 have been etched away to form the oversized holes 1310.

Figure 13E:
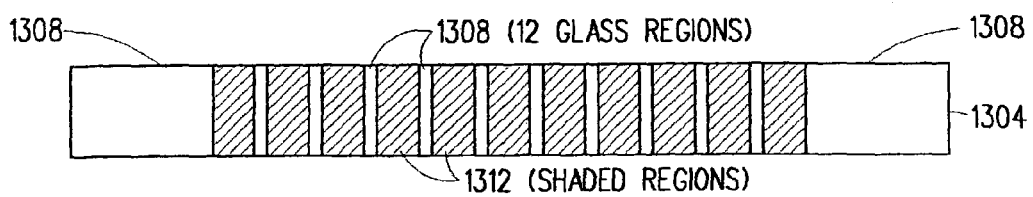
Figure 13F:
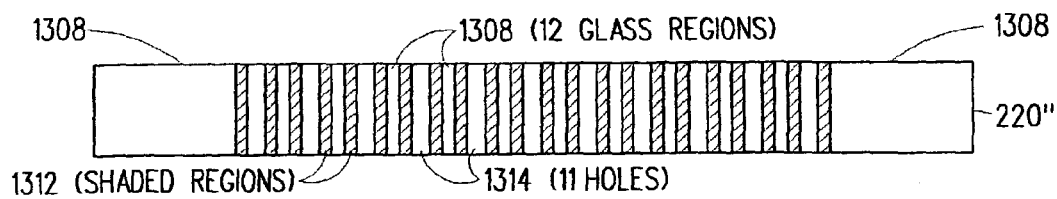
Figure 13G:
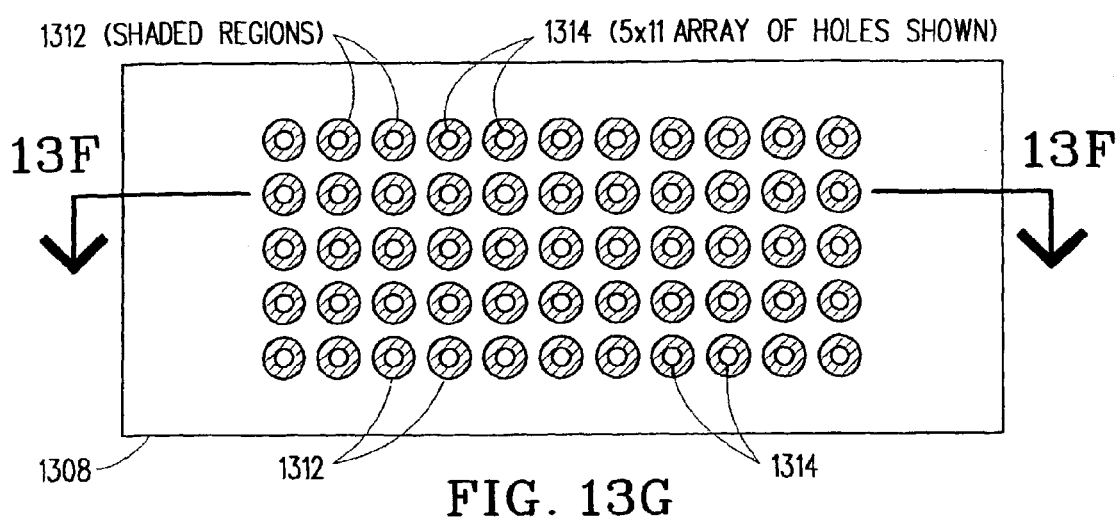
Figure 14A:
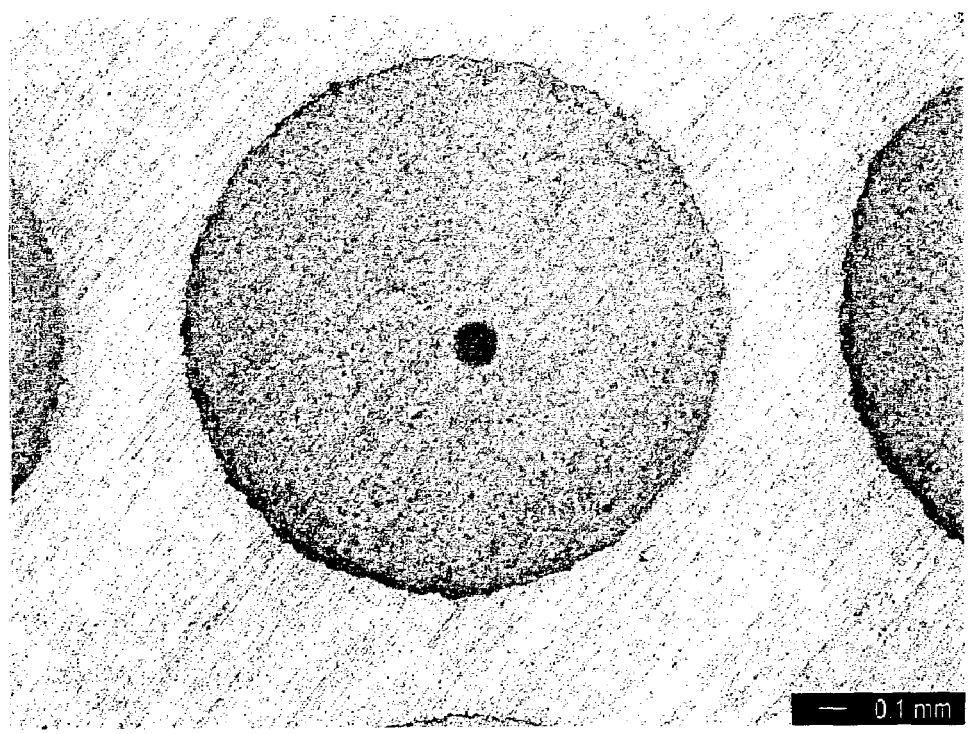
FIGS. 14A and 14B are respectively photographs of a top view and a bottom view of an exemplary fiber array fabricated in accordance with the method shown in FIG. 12.
Figure 14B:
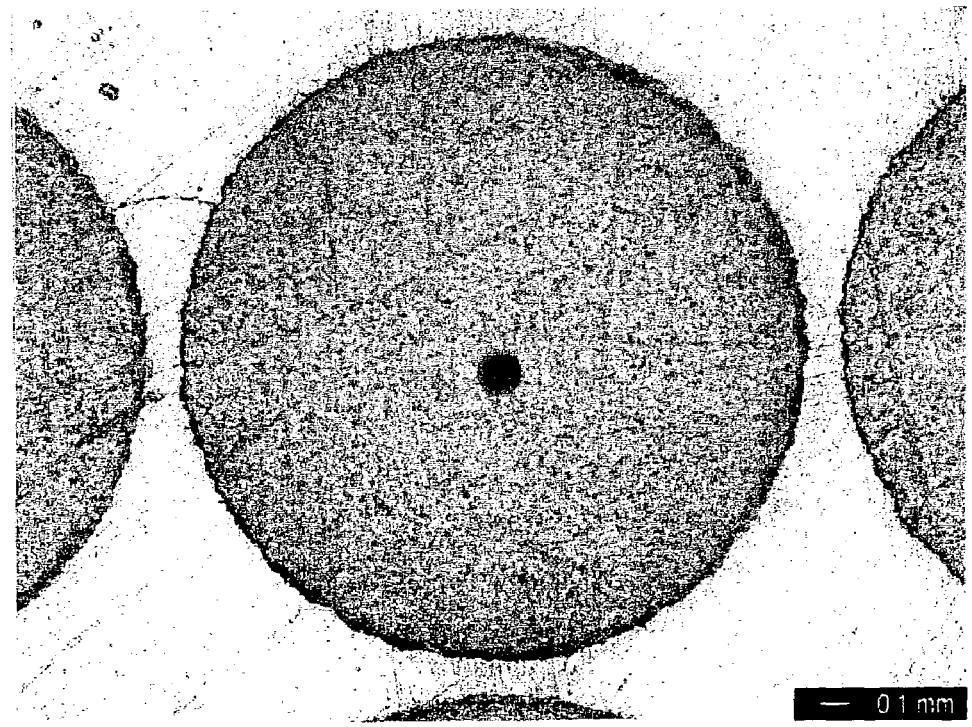

At step 1210, the oversized holes 1310 in the etched glass plate 1304 are filled or infiltrated with a moldable material 1312 (see FIG. 13E). Thereafter, the etched glass plate 1304 and the filled oversized holes 1310 can be lapped flat and parallel using an abrasive such as a 6–8 μm grit (for example). In the preferred embodiment, the moldable material 1312 can be any material (e.g., adhesive, polymer, graphite . . . ) that is soft enough to drill without sticking to a precision drill and without causing excessive wear and tear to the precision drill. In addition, the moldable material 1312 and the etched glass plate 1304 should have matching CTEs in the range of $\pm 0.5 \times 10^{-7}$. However, it is not critical that the moldable material 1312 and the etched glass plate 1304 have matching CTEs. For instance, if the moldable material 1312 has a greater CTE than the CTE of the etched glass plate 1304 then the moldable material 1312 would have a tendency in high temperatures to expand out of the oversized hole 1310. This is a better situation then when the etched glass plate 1304 has a greater CTE than the CTE of the moldable material 1312 because the moldable material 1312 would then have a tendency in higher temperatures to shrink away from the oversized hole 1310.

An adhesive known as MCA-80 adhesive which is manufactured and sold by Corning Incorporated is one example of a moldable material 1312 that can be used to fill the oversized holes 1310 in the etched glass plate 1304. The MCA-80 adhesive happens to have a CTE that matches the CTE of the etched glass plate 1304 that is made from FOTOFORM® glass. Below are listed some of the physical properties of the MCA-80 adhesive:

Viscosity @ 20 sec$^{-1}$ (poise): 75–175
   Postcure 2 h @ 125° C.: >170° C.
   Postcure 4 h @ 125° C.: >180° C.
Modulus @ 25° C. (pa): >5.5×10$^9$
Water Absorption$^2$ (% weight gain): <1.4%
Stress (degrees rotation): 10°–30°
Depth of Cure (mils):
   Initial: 18+/−5
   After 10 minutes: 30+/−5
Average CTE between −40° C. and 85° C. (μm/m/° C.): 8

A more detailed discussion about the composition of the MCA-80 adhesive is provided in U.S. Pat. No. 5,552,092 the contents of which are incorporated herein by reference. Again, it should be noted that a variety of adhesives and other types of moldable materials now known or subsequently developed can be used in the present invention.

At step 1212, a precision drill is used to drill the moldable material 1312 in each of the oversized holes 1310 to form holes 1314 (see FIG. 3F). An optical fiber is then inserted into each of the holes 1314 to create the fiber array 220". In the preferred embodiment, the locations of the holes 1314 are selected based on the center points of the lenses in the lens array (see FIG. 2). These locations are then translated into measured coordinates which can be used by a CNC based machine to drill the holes 1314. The CNC based machine can use carbide twist drills to drill the holes 1314. For example, the diameter of the holes 1314 could be in the range of 0.125 mm (for example). And, the accuracy of the center point locations of the holes 1314 with respect to each other +/−0.001 mm and the pitch could be 0.750 mm (for example). The drilled holes 1314 can also be counter-bored to help secure the optical fibers.

Like fiber array 220', this fiber array 220" can be coupled to a lens array to form a collimator array that can be used to perform a variety of signal processing steps including multiplexing, switching, filtering, polarizing and demultiplexing. Following is a brief list of some of other photonic applications that can use a collimator array:

Laser diode arrays.
   Optical Interconnects.
   Contact image sensors.
   Light emitting diode arrays.
   Liquid crystal display projection systems.
   Charge coupled device with a direct mounted lens array.
   2-D and 3-D optical switches.

It should be understood that the material used to make the fiber array 220' and 220" does not necessarily need to have the exact CTE as the material used to make the lens array. However, the material used to make the fiber array 220' and 220" should have a CTE that is relatively close to the CTE of the material used to make the lens array. In particular, the CTE match of the moldable material 1312 (if used), the fiber arrays 220' and 220" and the lens array should allow for sufficient alignment over the temperature range of −40° C.–100° C.

Although only two embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A fiber array, comprising:
a plurality of optical fibers; and
a glass plate including a plurality of holes in each of which there is secured one of the optical fibers, wherein said plurality of holes are formed by:
   placing a photomask over a photosensitive glass plate;
   exposing said photomask and selected regions in said photosensitive glass plate to an ultraviolet light;
   heating said exposed photosensitive glass plate to form therein a plurality of opal regions and a plurality of glass regions;
   etching said heated photosensitive glass plate until said plurality of opal regions are etched away to form oversized holes in said etched photosensitive glass;
   filling the oversized holes with a moldable material; and drilling the moldable material in the oversized holes to form the holes in which there is secured one of the optical fibers.

2. The fiber array of claim 1, wherein said glass plate including the secured optical fibers is mechanically set and aligned to a microlens array to form a collimator array.

3. The fiber array of claim 2, wherein said glass plate and said microlens array have matching coefficients of thermal expansion.

4. A fiber array comprising:
a plurality of optical fibers; and
a glass plate including a plurality of holes in each of which there is secured one of the optical fibers, wherein the holes were formed by etching away a plurality of opal regions within an exposed and heated photosensitive glass which after the etching became said glass plate that included a plurality of oversized holes which were filled with a moldable material that was then drilled to form the holes.

5. The fiber array of claim 4, wherein said glass plate including the secured optical fibers is mechanically set and aligned to a microlens array to form a collimator array.

6. The fiber army of claim 5, wherein said glass plate and said microlens array have matching coefficients of thermal expansion.

7. The fiber array of claim 4, wherein said moldable material and said glass plate have matching coefficients of thermal expansion in the range of $\pm 0.5 \times 10^{-7}$.

8. The fiber army of claim 4, wherein said moldable material is a polymer or a graphite.

9. A method for fabricating a fiber array, said method comprising the steps of:
   forming a plurality of holes in a photosensitive glass plate, said forming step of forming further includes the steps of:
      placing a photomask over a non-exposed photosensitive glass plate;
      exposing said photomask and selected regions in said non-exposed photosensitive glass plate to an ultraviolet light;
      heating said exposed photosensitive glass plate to form therein a plurality of opal regions and a plurality of glass regions;
      etching said heated photosensitive glass plate until said plurality of opal regions are etched away to form oversized holes;
      filling the oversized holes with a moldable material; and
      drilling the moldable material in the oversized holes to form the holes; and
   securing an optical fiber in each hole of the drilled photosensitive glass plate which after the etching step became a glass plate that resembles said fiber array.

10. The method of claim 9, further comprising the steps of mechanically setting and aligning said fiber array to a microlens array to form a collimator array.

11. The method of claim 10, wherein said fiber array and said microlens array have matching coefficients of thermal expansion over the −40° C. to 100° C. range.

12. The method of claim 10, wherein said moldable material and said glass plate have matching coefficients of thermal expansion in the range of $\pm 0.5 \times 10^{-7}$.

13. The method of claim 9, wherein said moldable material is a polymer or a graphite.

14. The method of claim 9, wherein said moldable material is soft enough to drill without sticking to a precision drill and without causing excessive wear and tear to the precision drill.

15. A collimator array, comprising:
   a lens array; and
   a fiber array including a plurality of optical fibers and a plurality of holes in each of which there is secured one of the optical fibers, wherein said plurality of holes are formed by:
   placing a photomask over a photosensitive glass plate;
   exposing said photomask and selected regions in said photosensitive glass plate to an ultraviolet light;
   heating said exposed photosensitive glass plate to form therein a plurality of opal regions and a plurality of glass regions;
   etching said heated photosensitive glass plate until said plurality of opal regions are etched away to form oversized holes in said etched photosensitive glass;
   filling the oversized holes with a moldable material; and
   drilling the moldable material in the oversized holes to form the holes.

16. The collimator array of claim 15, wherein said lens array and said fiber array have matching coefficients of thermal expansion.

* * * * *